Patented May 27, 1947

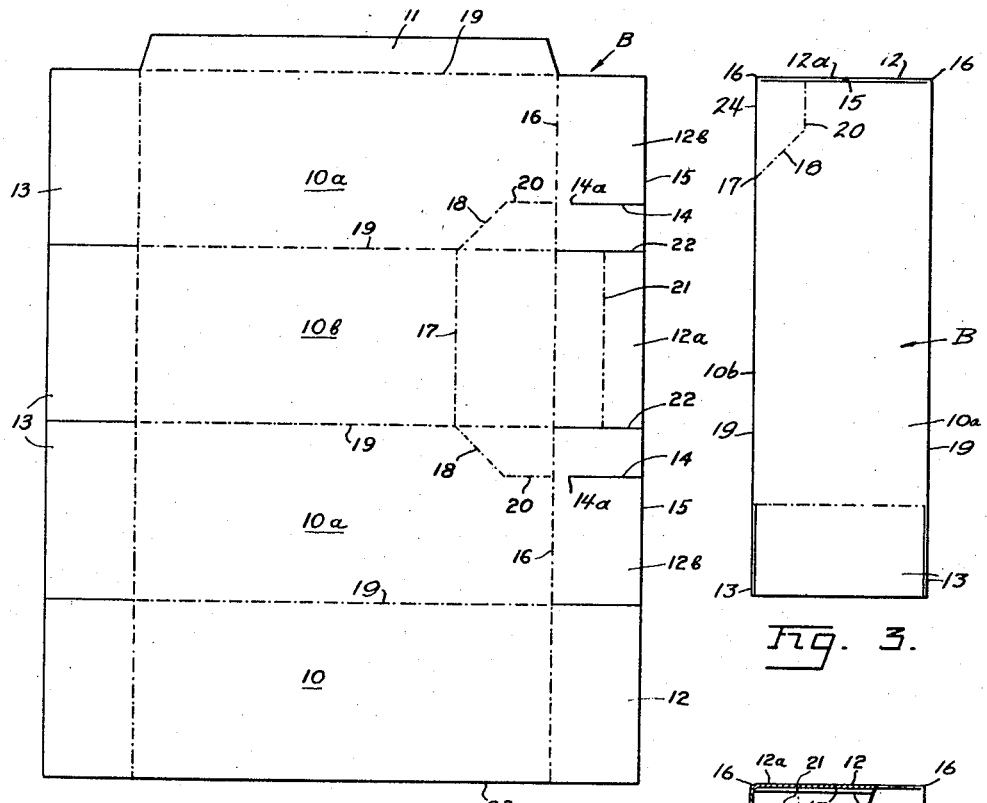
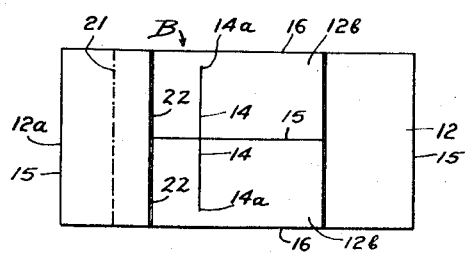
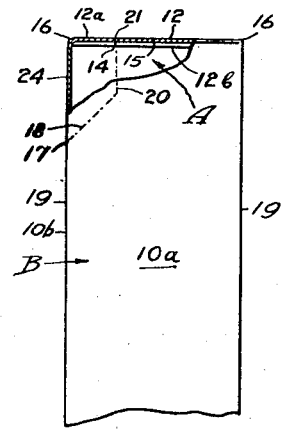
May 27, 1947. T. CARR 2,421,141
DISPENSING PACKAGE
Filed Oct. 6, 1943 2 Sheets-Sheet 1
INVENTOR.
TREM CARR
BY
ATTORNEYS

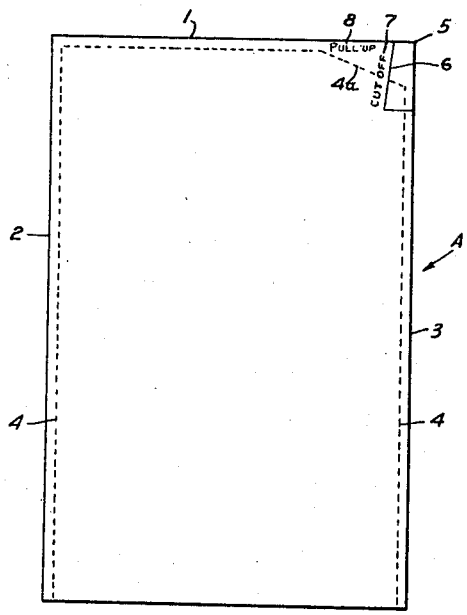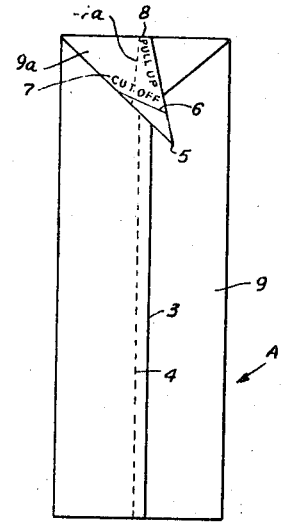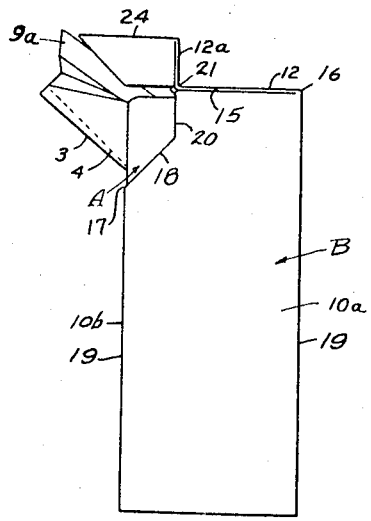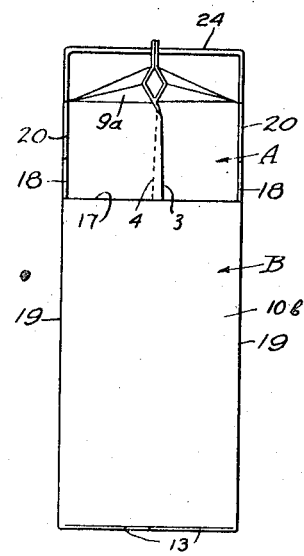

2,421,141

UNITED STATES PATENT OFFICE 2,421,141

DISPENSING PACKAGE

Trem Carr, Hollywood, Calif.

Application October 6, 1943, Serial No. 505,244

2 Claims. (Cl. 229—17)

The present invention relates to improvements in a dispensing package, and it consists of the combinations, constructions and arrangements hereinafter described and claimed.

An object of my invention is to provide a dispensing package which is an improvement over the form of the device shown in my Patent Number 2,321,655, issued on June 15, 1943. In the patent I disclose an inner receptacle made of rubber or other liquid-proof material and this inner container is folded in such a manner as to provide a pouring spout when the container is opened. An outer receptacle made of cardboard or other similar material houses the inner container and supports it. A wall of the outer container or receptacle is perforated so that it may be readily torn from the container and then the spout of the inner container can be extended through the opening provided in the outer container for pouring purposes.

In the present invention, I provide an inner container or receptacle of an improved construction over that shown in my patent and I also provide an outer container or receptacle which has novel means for opening it in order to give access to the inner container. The inner container is formed of two initially flat pieces of material that are cemented to each other along their edges by the application of heat and pressure. This container is formed into a rectangular prism and then inserted into the outer container.

The outer container or receptacle has novel means for permitting one entire side of the container to be opened when the receptacle is to be used for pouring and when the container is opened in this manner, it will disclose the pouring spout of the inner container. If all of the liquid contents are not used it is possible to fold the pouring spout back into the outer receptacle and then swing the lid of the outer container back into closed position. In this way the contents of the inner container is protected.

The device is simple in construction and provides a novel means for transporting a liquid such as milk or oil, the inner limp container housing the liquid, while the outer semi-rigid container protects the inner one and permits the package to be shipped.

Other objects and advantages will appear in the following specification, and the novel features of the device will be particularly pointed out in the appended claims.

My invention is illustrated in the accompanying drawing forming a part of this application, in which:

Figure 1 is a blank of the outer container or receptacle;

Figure 2 is a top plan view showing the outer container folded with the exception of two of the top flaps which are still shown open;

Figure 3 is a side elevation of the outer container folded with the exception of the bottom flaps which are still open;

Figure 4 is a side elevation of the upper portion of the outer container, a portion of the top being shown in section;

Figure 5 is a side elevation of the inner container with the two pieces forming the container shown flat;

Figure 6 is a side elevation of the inner container with the two walls formed into a square hollow prism;

Figure 7 shows the inner container received in the outer one with the closure of the outer container opened to disclose the pouring spout; and Figure 8 is a side elevation of the outer container with the closure swung into open position and the spout of the inner container extended for pouring.

While I have shown only the preferred form of my invention, it should be understood that various changes or modifications may be made within the scope of the appended claims without departing from the spirit and scope of the invention.

I will first describe the construction of the inner receptacle which is shown in Figures 5 and 6 and then will describe the construction of the outer receptacle.

Inner receptacle

The inner receptacle A is shown composed of two pieces of material in Figure 5. The receptacle or container A may be constructed of any one of a number of flexible, light sheet materials such as chlorinated rubber, known commercially as Pliofilm or Diaphane; a heat-sealing paper product, comprising glassine, or preferably vegetable parchment rendered impervious by a flexible impregnated coating comprising a wax and/or a resin and a plasticizer. Other suitable flexible, impervious sheet materials may be used such as sheets containing organic esters or cellulose or cellulose esters, rendered impervious, if necessary because of their hygroscopic tendencies, by a suitable flexible coating comprising a wax and/or resin or a coating composition having latex as a basic ingredient, polyvinyl films, such as the vinyl chloride films known as Koroseal or Vinylite, or polyamide films, such as the film known as Nylon.

The inner receptacle A is formed of two flat sheets of material of any one of the above products or similar products and these sheets are rectangular in shape. The top 1 and the two sides 2 and 3 of both sheets are sealed together by applying heat and pressure along the three edges, the sealed portion being indicated by the dotted line 4. The upper right-hand corner 5 of the receptacle has a triangular portion of both pieces of material sealed together as indicated by the inclined dotted line portion 4a, and this will provide a finger-grip for the inner container which will be explained more fully hereinafter. An L-shaped line 6 adjacent to the corner 5 has the words "cut-off" shown at 7 associated therewith. This cut-off line informs a person where to cut the material inner receptacle so that a pouring spout will be formed. The words "pull up" indicated at 8 may be placed on the corner 5 as a further direction for pulling up the flap prior to cutting.

After the inner package has been sealed along three edges, it is formed into a hollow square prism as indicated in Figure 6, the lower portion of the package still remaining open for filling purposes. The sealed edges 2 and 3 now extend along the center of the package side walls 9 and the top of the package has two flaps 9a which are bent downwardly, as indicated in Figure 6. The flap adjacent to the corner 5 will have the words "pull up" viewable and there will also be the words "cut off" printed on this flap. The finger grip opens the spout for perfect pouring by an upward pull on the cover 5. The inner receptacle is now ready to be placed in the outer receptacle.

Outer receptacle

The outer receptacle B is shown in Figures 1 to 4 inclusive. This receptacle may be made of any cardboard material desired and the blank forming the receptacle is shown in Figure 1. The receptacle has a rear panel 10, two side panels 10a, and a front panel 10b. A side glue flap 11 extends along the edge of one of the side panels 10a. The panel 10 has a top flap 12 and a bottom flap 13, while the side panels 10a have top flaps 12b and the front panel 10b has top flap 12a. The top flaps 12b of the side panels 10a have cuts 14 extending inwardly from the outer edges 15 to a short distance from a folding line 16 for the top flaps. The front panel 10b has a score line 17 extending transversely across the panel and spaced the desired distance below the folding line 16. The side panels 10a have score lines 18 extending at an angle of 45° to the folding lines 19 of the container. The score lines 18 are joined by other score lines 20 that extend parallel with the lines 19 and are aligned with the cuts 14. The score lines 20 stop at the lines 16.

The top flap 12a associated with the front panel 10b has a folding line 21 extending transversely across the top and spaced the same distance from the fold line 16 as the cuts 14 are spaced from the edges 22 of the side top flaps 12b. It should be noted at this point that all four bottom flaps 13 of the carton are cut so that when the carton is folded, the pairs of flaps will have their adjacent edges abutting each other, this resulting in practically no waste of board.

Figures 2, 3 and 4 show the outer carton B folded, Figure 3 showing the bottom of the carton with the flaps 13 still open and ready to receive the inner container A. In folding the carton B, the panels 10 are folded along the edges 19 and then the side glue flap 11 is secured to the opposite panel 10, the corner 19 of the glue flap being aligned with the edge 23 of the opposite panel 10. The side top flaps 12b are now bent inwardly toward each other so that the edges 15 abut each other. This will align the cuts 14 with each other as shown in Figure 2. The ends 14a of the cuts are spaced from the corners 16.

The front and back top flaps 12a and 12 are now folded down upon the side flaps 12b and are glued thereto. The fold line 21 on the flap 12a will be above and register with the aligned cuts 14 as shown in Figure 4. The top of the carton is now completely closed.

The inner container or receptacle A is moved into the outer receptacle B from the bottom, care being taken that the turned-down flap 9a of the inner container carrying the pull up corner 5 registers with the front panel 10b so that when this panel is severed along the score line 17 and the closure 24 formed by the severing, lifted, it will expose the flap 9a of the inner container.

The bottom of the inner container is open and the receptacle is filled through the bottom. After the inner container has been filled with any desired contents, such as milk, oil, etc., the lower portion of the inner container has its two edges sealed together and the resulting flaps are folded over in much the same manner as the top flaps except that the bottom flaps are folded along the bottom of the inner receptacle. After the inner container has been sealed, the lower flaps 13 of the outer container are folded down upon each other in opposed pairs and are glued together thus completing the closing and sealing of the entire dispensing package.

From the foregoing description of the various parts of the device, the operation thereof may be readily understood.

The dispensing package is sturdy and the outer receptacle will protect the contents of the inner receptacle for shipping. The wall of the inner receptacle is impervious to liquid and will prevent the liquid contents from seeping through the walls of the outer container. When it is desired to pour the liquid from the dispensing package, the score lines 17, 18 and 20 are cut with either a knife or merely by pressing inwardly on the container with the thumb along the lines 17, 18 and 20 of the scoring. This forms a closure 24 which may be lifted and will swing about the fold line 21 as a hinge. It will be noted that although the top of the closure has two thicknesses of material consisting of the flaps 12b and the flap 12a, the hinge portion consists of substantially only one thickness of material because the cut lines 14 coincide with the fold line 21. This will weaken the closure along the hinge line 21 and permit the closure to be opened more readily than where two thicknesses of material formed the hinge.

When the closure 24 is opened, the flap 9a of the inner receptacle is pulled upwardly and outwardly by the finger grip and then it is cut along the line 6. The cut flap when extended forms a pouring spout, see Figures 7 and 8. Any portion or all of the liquid contents of the inner receptacle may be poured from the receptacle. The finger grip opens the spout for perfect pouring. If all of the contents are not poured, the remaining portion can be protected by folding the flap 9a down into position and then swinging the closure 24 back into closed position.

I claim:

1. A dispensing package comprising: an inner container prismatic in shape and having a triangularly-shaped pouring spout whose base extends entirely across one of the upper edges of the container; a carrier receptacle having four walls and a top of double thickness enclosing the container, one of the walls confining said pouring spout flatwise against the container; the said receptacle wall and adjacent portions of adjoining walls and the outer layer of the top having score lines defining a closure that takes in a portion of the container top disposed adjacent to the pouring spout, a portion of the container wall normally contacted by the spout, and portions of the adjoining container walls; the under layer of the receptacle top having a cut lying directly beneath the top score line; the score lines on the receptacle when broken permitting the closure to be opened and to swing about the top score line as a hinge, to leave an opening in the receptacle large enough to permit the projection of the spout therethrough, said spout when being folded back down upon the container being completely covered by the closure when the latter is swung into closed position.

2. A dispensing package comprising an inner container having a top and a pouring spout disposed adjacent to the top; a carrier receptacle having side walls and a top of double thickness enclosing the container, one of the walls confining the pouring spout flatwise against the container; the said receptacle wall and adjacent portions of adjoining walls and the outer layer of the top having score lines defining a closure that takes in a portion of the container top disposed adjacent to the pouring spout, a portion of the container wall normally contacted by the spout, and portions of the adjoining container walls; the under layer of the receptacle top having a cut lying directly beneath the top score line; the score lines on the receptacle when broken permitting the closure to be opened and to swing about the top score line as a hinge to leave an opening in the receptacle large enough to permit the projection of the spout therethrough.

TREM CARR.

REFERENCES CITED

The following references are of record in the file of this patent:

UNITED STATES PATENTS

| Number | Name | Date |
| --- | --- | --- |
| 2,170,378 | Ostrom | Aug. 22, 1939 |
| 2,077,046 | Klohr et al. | Apr. 13, 1937 |
| 2,056,804 | Potdevin | Oct. 6, 1936 |
| 2,335,159 | Salfisberg | Nov. 23, 1943 |
| 1,920,227 | Wilder | Aug. 1, 1933 |
| 2,139,021 | Johnson | Dec. 6, 1938 |
| 893,616 | Ferres | July 21, 1908 |
| 941,356 | Byrne | Nov. 30, 1909 |
| 2,339,156 | Davis | Jan. 11, 1944 |
| 1,907,067 | Hartman | May 2, 1933 |